US012570295B2

(12) United States Patent
Rydström et al.

(10) Patent No.: US 12,570,295 B2
(45) Date of Patent: Mar. 10, 2026

(54) FAST FREE-ROLLING OF WHEELS FOR ROBUST VEHICLE SPEED OVER GROUND DETERMINATION

(71) Applicant: VOLVO TRUCK CORPORATION, Gothenburg (SE)

(72) Inventors: Mats Rydström, Billdal (SE); Mats Jonasson, Partille (SE); Adithya Arikere, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 15 days.

(21) Appl. No.: 18/845,812

(22) PCT Filed: Jun. 29, 2022

(86) PCT No.: PCT/EP2022/067839
§ 371 (c)(1),
(2) Date: Sep. 10, 2024

(87) PCT Pub. No.: WO2023/169702
PCT Pub. Date: Sep. 14, 2023

(65) Prior Publication Data
US 2025/0206273 A1      Jun. 26, 2025

(30) Foreign Application Priority Data

| Mar. 10, 2022 | (WO) | ................. | PCT/EP2022/056181 |
| Jun. 2, 2022 | (WO) | ................. | PCT/EP2022/065085 |
| Jun. 3, 2022 | (WO) | ................. | PCT/EP2022/065278 |

(51) Int. Cl.
*B60W 40/00*      (2006.01)
*B60T 8/17*       (2006.01)
(Continued)

(52) U.S. Cl.
CPC ......... *B60W 40/105* (2013.01); *B60T 8/1708* (2013.01); *B60T 8/172* (2013.01); (Continued)

(58) Field of Classification Search
CPC ............... B60W 40/105; B60W 30/02; B60W 2520/105; B60W 2520/28; (Continued)

(56) References Cited

U.S. PATENT DOCUMENTS

| 5,173,860 A | 12/1992 | Walenty et al. | |
| 5,579,230 A * | 11/1996 | Lin ........................ | B60T 8/172 |
| | | | 180/197 |

(Continued)

FOREIGN PATENT DOCUMENTS

| CN | 201486706 U | 5/2010 |
| EP | 3851346 A1 | 7/2021 |

(Continued)

OTHER PUBLICATIONS

International Search Report and Written Opinion of the International Searching Authority in corresponding International Application No. PCT/EP2022/067839 mailed Dec. 2, 2022 (8 pages).

(Continued)

*Primary Examiner* — Phutthiwat Wongwian
*Assistant Examiner* — Sherman D Manley
(74) *Attorney, Agent, or Firm* — Jeffri A. Kaminski; Venable LLP

(57) ABSTRACT

A vehicle motion management, VMM, system for a heavy-duty vehicle has at least one wheel speed sensor to output a wheel speed signal indicative of a rotation speed of a wheel on the vehicle, and at least one torque-generating device to apply torque to the wheel. The VMM system comprises processing circuitry arranged to determine at least the direction of a current applied torque at the wheel, and in prepa- (Continued)

ration for determining wheel speed by the wheel speed signal, to apply a transient amount of torque to the wheel by the torque-generating device during a limited time period in a direction opposite to the direction of the current applied torque at the wheel.

15 Claims, 4 Drawing Sheets

(51) Int. Cl.

| | |
|---|---|
| *B60T 8/172* | (2006.01) |
| *B60T 8/32* | (2006.01) |
| *B60W 30/02* | (2012.01) |
| *B60W 40/105* | (2012.01) |

(52) U.S. Cl.
CPC .............. *B60T 8/32* (2013.01); *B60W 30/02* (2013.01); *B60T 2250/04* (2013.01); *B60W 2520/105* (2013.01); *B60W 2520/28* (2013.01); *B60W 2720/30* (2013.01)

(58) Field of Classification Search
CPC .. B60W 2720/30; B60T 8/1708; B60T 8/172; B60T 8/32; B60T 2250/04; B60T 8/171; B60Y 2400/81
See application file for complete search history.

(56) References Cited

U.S. PATENT DOCUMENTS

| | | | | |
|---|---|---|---|---|
| 6,194,850 | B1 * | 2/2001 | Kumar ................... | B60T 8/1705 |
| | | | | 318/587 |
| 6,758,087 | B2 * | 7/2004 | Balch ........................ | G01P 3/56 |
| | | | | 73/488 |
| 2004/0138802 | A1 | 7/2004 | Kuragaki et al. | |
| 2005/0038588 | A1 | 2/2005 | Shukla | |
| 2015/0127237 | A1 | 5/2015 | Blyth et al. | |
| 2015/0291178 | A1 | 10/2015 | You et al. | |
| 2016/0368503 | A1 | 12/2016 | Jonasson et al. | |
| 2018/0178767 | A1 | 6/2018 | Chanda | |
| 2018/0273045 | A1 | 9/2018 | Herrera et al. | |
| 2020/0191938 | A1 | 6/2020 | Green et al. | |
| 2025/0178575 | A1 * | 6/2025 | Rydström ............. | B60T 8/1708 |

FOREIGN PATENT DOCUMENTS

| | | | |
|---|---|---|---|
| GB | 472452 | A | 9/1937 |
| JP | H06159175 | A | 6/1994 |
| JP | 2006327242 | A | 12/2006 |
| WO | 2017215751 | A1 | 12/2017 |
| WO | 2021144009 | A1 | 7/2021 |
| WO | 2021144010 | A1 | 7/2021 |
| WO | 2021144065 | A1 | 7/2021 |

OTHER PUBLICATIONS

International Search Report and Written Opinion of the International Searching Authority in corresponding International Application No. PCT/EP2022/065278 mailed Nov. 22, 2022 (10 pages).
International Preliminary Report on Patentability Chapter II in corresponding International Application No. PCT/EP2022/065278 dated Oct. 5, 2023 (6 pages).
International Search Report and Written Opinion of the International Searching Authority in corresponding International Application No. PCT/EP2022/065082 mailed Nov. 7, 2022 (9 pages).
International Preliminary Report on Patentability Chapter Il in corresponding International Application No. PCT/EP2022/065082 dated Sep. 28, 2023 (6 pages).
International Search Report and Written Opinion of the International Searching Authority in corresponding International Application No. PCT/EP2022/056181 mailed Oct. 7, 2022 (10 pages).
International Preliminary Report on Patentability Chapter Il in corresponding International Application No. PCT/EP2022/056181 dated Oct. 5, 2023 (5 pages).
Gillespie, Thomas D.; "Fundamentals of Vehicle Dynamics"; Warrendale, PA: Society of Automotive Engineers(1992); ISBN 978-0-7680-2333-6; 24 pages.
Hans B. Pacejka; "Tyre and Vehicle Dynamics" (Third Edition); published Butterworth-Heinemann, 2012; ISBN 978-0-08-097016-5; https://doi.org/10.1016/B978-0-08-097016-5.00007-3; 621 pages.
Sandeep Rao; "Introduction to mmwave Sensing: FMCW Radars"; Texas Instruments; 2017; 70 pages.

* cited by examiner

FAST FREE-ROLLING OF WHEELS FOR ROBUST VEHICLE SPEED OVER GROUND DETERMINATION

CROSS-REFERENCE TO RELATED APPLICATIONS

This application is a U.S. National Stage application of PCT/EP2022/067839, Jun. 29, 2022 and published on Sep. 14, 2023 as WO 2023/169702, which claims the benefit of International Patent Application Nos. PCT/EP2022/056181, filed Mar. 10, 2022, PCT/EP2022/065082, filed Jun. 2, 2022, and PCT/EP2022/065278, filed Jun. 3, 2022, all of which are hereby incorporated by reference in their entireties.

TECHNICAL FIELD

The present disclosure relates to methods and control units for robust heavy-duty vehicle motion estimation. The methods are particularly suitable for use with cargo transporting vehicles, such as trucks and semi-trailers. The invention can however also be applied in other types of heavy-duty vehicles, e.g., in construction equipment and in mining vehicles, as well as in cars.

BACKGROUND

Heavy-duty vehicles have traditionally been controlled using torque request signals generated based on the position of an accelerator pedal or brake pedal and sent to motion support devices (MSDs) such as service brakes and propulsion devices over a controller area network (CAN) bus. However, advantages may be obtained by instead controlling the actuators using wheel slip or wheel speed requests sent from a central vehicle controller to the different actuators. This moves the actuator control closer to the wheel end, and therefore allows for a reduced latency and a faster more accurate control of the MSDs. Wheel-slip based MSD control approaches are particularly suitable for use with wheel-end electrical machines in a battery or fuel cell powered heavy-duty vehicle, where motor axle speeds can be accurately controlled at high bandwidth and with low latency. Wheel-slip based vehicle motion management (VMM) and its associated advantages are discussed, e.g., in WO 2017/215751 A1 and also in WO 2021/144010 A1.

Wheel slip based control of heavy-duty vehicles rely on accurate knowledge of the vehicle speed over ground and on the rotation speed of the wheel, since these two quantities together determine the wheel slip. The rotation speed of the wheel can be reliably obtained from sensors such as Hall effect sensors or rotary encoders. However, the vehicle speed over ground may be more difficult to obtain robustly and in a cost efficient manner, at least in some of the more challenging environments and operating conditions, such as low friction operating conditions, split friction operating conditions, and during maneuvering involving large wheel forces.

A global positioning system (GPS) receiver is often able to determine vehicle speed over ground, but satellite systems are prone to error in environments with strong multipath radio propagation and of course require a clear view of the sky to operate, which is not always available. Camera systems and/or radar systems may also be used, but these are costly and less effective in certain weather conditions.

There is a continuing need for reliable and cost-effective methods of determining vehicle speed over ground suitable for use in heavy-duty vehicles, and in particular for heavy-duty vehicles controlled based on wheel slip.

SUMMARY

It is an object of the present disclosure to provide improved methods for determining the speed over ground of a heavy-duty vehicle, and for performing vehicle motion management of heavy-duty vehicles. The object is obtained by a VMM system for a heavy-duty vehicle. The system comprises at least one wheel speed sensor configured to output a wheel speed signal indicative of a rotation speed of a wheel on the vehicle, and at least one torque-generating device arranged to apply torque to the wheel. The VMM system also comprises processing circuitry arranged to determine at least the direction of a current applied torque at the wheel, and in preparation for determining wheel speed by the wheel speed signal, to apply a transient amount of torque to the wheel by the torque-generating device during a limited time period in a direction opposite to the direction of the current applied torque at the wheel. By applying a counter-torque in this manner a mechanical impulse is generated at the wheel which "un-slips" the wheel from its state of slip due to the currently applied torque. In other words, the applied counter-torque causes the wheel speed to be closer to the actual speed over ground of the vehicle faster than if the torque has simply been reduced by a significant amount. After application of the counter-torque, the wheel speed signal can be used to obtain more reliable information about vehicle speed over ground. The impact on overall vehicle motion control from the process of using wheel speed sensors to sample vehicle speed over ground is reduced since the process becomes faster, which is an advantage.

The at least one torque-generating device is preferably controlled by an MSD control unit arranged to receive a request for vehicle speed determination. Thus, the application of counter-torque can be performed locally at high control bandwidth, allowing a central controller to submit a request for vehicle speed over ground information to the local controller, and receive accurate vehicle speed over ground information back from the local controller with reduced impact on overall vehicle motion control.

The at least one torque-generating device may comprise an electric machine and/or a friction brake. It is also possible to use other torque generating devices, such as internal combustion engines to generate counter-torque, i.e., the above-mentioned transient amount of torque of opposite sign compared to the currently applied torque used for vehicle maneuvering.

The duration of the limited time period and/or the transient amount of torque is optionally determined based on a speed difference between the wheel speed and the vehicle speed. This speed difference is to be compensated for by the applied angular impulse at the wheel. The larger the speed difference the larger the required angular impulse in order to bring the wheel speed close to the vehicle speed over ground. The duration of the limited time period and/or the transient amount of torque can also be determined based on an inertia of the wheel on the vehicle, which makes the un-slipping of the wheel more accurate, since it is now tailored to the properties of the wheel. The required parameters, i.e., the vehicle speed over ground and/or the wheel system inertia, can be estimated using known methods. The vehicle speed over ground can for instance be estimated using an output signal from an inertial measurement unit (IMU).

The duration of the limited time period and/or the transient amount of torque can also at least partly be determined based on a type of the vehicle and/or based on a type of tyres mounted on the wheel. This means that the procedure for un-slipping wheels using a burst of counter-torque can be tailored to specific vehicle types and/or to specific tyres, resulting in a more accurate unslipping process, which is both faster and which brings the wheel speed of rotation closer to the true vehicle speed over ground. A look-up table or the like can be periodically updated based on measured responses by the wheel to applied amounts of mechanical impulse.

Aspects of the disclosure also relates to a VMM system for a heavy-duty vehicle. The system comprises at least one wheel speed sensor configured to output a wheel speed signal indicative of a rotation speed of a respective wheel on the vehicle and at least one IMU configured to output an IMU signal indicative of an acceleration of the vehicle. The system also comprises a motion estimation function configured to estimate a vehicle motion state comprising a vehicle speed over ground, based at least in part on the wheel speed signal and at least in part on the IMU signal, and an MSD coordination function configured to coordinate actuation of a plurality of MSDs of the heavy-duty vehicle in dependence of a vehicle motion request and the estimated vehicle motion state. The motion estimation function is arranged to model an error in the estimated vehicle motion state, and to output a free-rolling request to the MSD coordination function in case the modelled error fails to meet an acceptance criterion, and the MSD coordination function is arranged to reduce a wheel slip set-point of one or more wheels of the heavy-duty vehicle in response to receiving the free-rolling request from the motion estimation function. This way the accuracy in the estimation of vehicle speed over ground can be maintained despite the fact that the wheel speed sensor signals differ from the vehicle speed over ground due to wheel slippage. The system monitors state estimation error, and selectively places one or more wheels in a reduced slip condition when necessary to obtain accurate data on the vehicle speed over ground. This means that the determination of current wheel slip becomes more accurate, which in turn means that wheel slip based control of the heavy-duty vehicle becomes more efficient. The methods disclosed herein for sampling vehicle speed over ground using wheel speed sensors involving application of a counter-torque means that the wheel speed signal can be sampled faster, whereupon torque can be re-applied with a smaller delay, which is an advantage.

According to some aspects, the motion estimation function is configured to estimate the vehicle motion state based on the wheel speed signal with a delay relative to the reduction in the wheel slip set-point. This way transient effects are accounted for, which could otherwise cause error in the estimated vehicle motion state. The motion estimation function can also be configured to estimate the vehicle motion state based on the wheel speed signal as an extreme value of the wheel speed signal over a time period. This way transients are also avoided, and the relevance of the wheel speed data for estimating vehicle speed over ground is increased. The delay will be significantly reduced in case a counter-torque is applied as part of the vehicle speed over ground sampling.

The motion estimation function is preferably arranged to model the error in the estimated vehicle motion state at least in part by modelling an error associated with the IMU signal as a function increasing with time. Various such time-increasing functions are conceivable. Some examples will be given below. A linear of affine function can, for instance, represent an option that does not bring substantive computational burden.

According to some aspects, the motion estimation function is arranged to base the estimated vehicle motion state primarily on the IMU signal in case of an applied torque at the wheel on the vehicle, and on the wheel speed signal otherwise. This selection can, for instance, be implemented as a weighting between the two sensor data types, or a simple switching based on which type that is deemed most reliable at any given point in time. Thus, the motion estimation function may also be arranged to base the estimate of vehicle motion state on a weighted combination of the wheel speed signal and the IMU signal, where the weights of the weighted combination is configured in dependence of the data indicative of wheel slip set-point and/or torque set-point.

The MSD coordination function may be configured to coordinate actuation of the plurality of MSDs of the heavy-duty vehicle based on the solution to a constrained optimization problem, where one or more constraints of the constrained optimization problem is arranged to be configured in dependence of if the free-rolling request has been received. This type of mathematical optimization allows the VMM system to account for the selective and temporary free-rolling of wheels without it affecting the overall motion of the vehicle to a great extent, since other MSD actuators can be used to compensate for the intermittent free-rolling of one or more wheels.

The MSD coordination function is preferably arranged to output data indicative of a wheel slip set-point and/or a torque set-point of a wheel on the heavy-duty vehicle to the motion estimation function. This allows the motion estimation function to estimate the vehicle motion state based on the data indicative of wheel slip set-point and/or torque set-point. The data can, for instance, be used to determine which wheel speed sensors that output reliable data and which wheel speed sensors that should be avoided when determining vehicle speed over ground. The output data indicative of wheel slip set-point and/or torque set-point can also be used by the motion estimation function to adjust the motion estimation proactively, i.e., before a wheel starts to slip or ceases to slip, which is an advantage. The information related to wheel slip set-point and/or torque set-point of the wheel can also comprise data indicative of if the counter-torque discussed above has been applied or is being applied.

The MSD coordination function can also be arranged to reduce respective wheel slip set-points of the one or more wheels of the heavy-duty vehicle in a sequence, where each wheel in the sequence is placed in a low slip condition for a pre-determined duration of time. This way the effects of the free-rolling on the vehicle can be balanced in order to reduce overall impact on the vehicle motion.

There is also disclosed herein control units, vehicles, computer programs, computer readable media, and computer program products associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
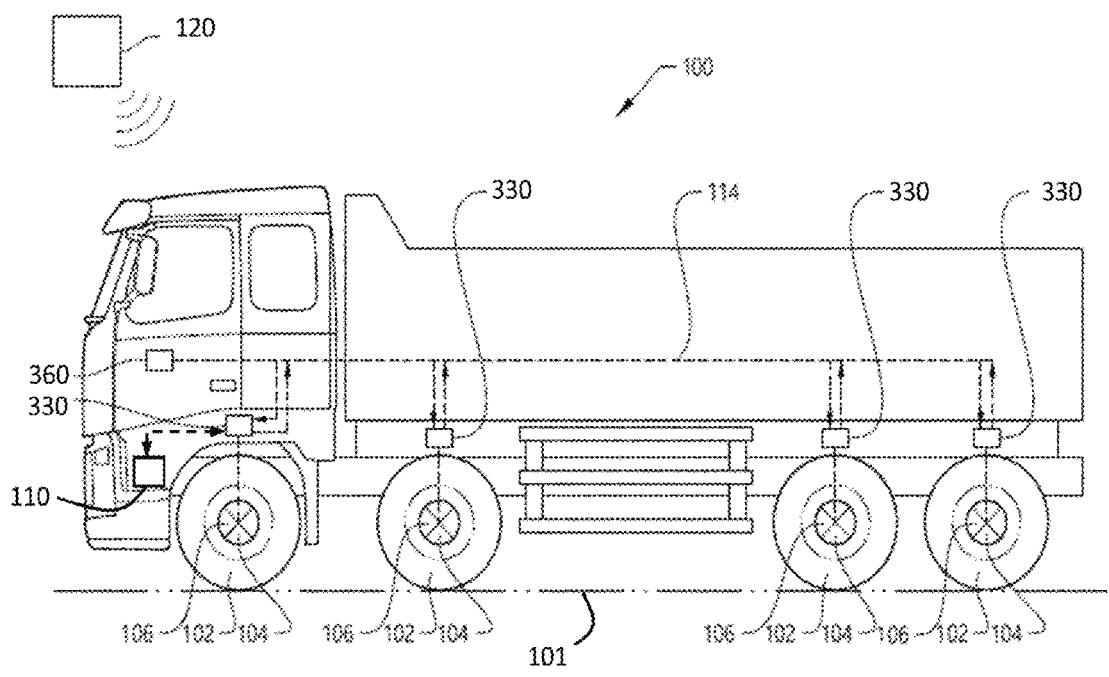
FIG. 1 illustrates an example heavy-duty vehicle.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

FIG. 1 illustrates an example heavy-duty vehicle 100, here in the form of a truck. It is appreciated that the herein disclosed methods and control units can be applied with advantage also in other types of heavy-duty vehicles, such as trucks with drawbar connections, construction equipment, buses, and the like. The vehicle 100 may also comprise more than two vehicle units. A dolly vehicle unit may for instance be used to tow more than one trailer.

The example vehicle 100 comprises a plurality of wheels 102, wherein at least a subset of the wheels 102 comprises a respective motion support device (MSD) 104, i.e., a torque generating device or other arrangement configured to affect vehicle motion behavior. Although the embodiment depicted in FIG. 1 illustrates an MSD 104 for each of the wheels 102, it should be readily understood that e.g., one pair of wheels 102 may be arranged without such an MSD 104. Also, an MSD may be arranged connected to more than one wheel, e.g., via a differential drive arrangement or the like.

The MSDs 104 may be arranged for generating a torque on a respective wheel of the vehicle or for both wheels of an axle. The MSD may be a propulsion device, such as an electric machine arranged to e.g., provide a longitudinal wheel force to the wheel(s) of the vehicle 100. Such an electric machine may thus be adapted to generate a propulsion torque as well as to be arranged in a regenerative braking mode for electrically charging a battery (not shown) or other energy storage system(s) of the vehicle 100. An advantage with electric machines in the context of the present application is that they can quickly change between application of a positive torque (a propulsion torque) and a negative torque (a braking torque).

The MSDs 104 may also comprise friction brakes such as disc brakes or drum brakes arranged to generate negative torque by the wheel 102 in order to decelerate the vehicle. Herein, the term acceleration is to be construed broadly to encompass both positive acceleration (propulsion) and negative acceleration (braking).

At least some of the wheels 102 on the vehicle 100 are equipped with wheel speed sensors 106. A wheel speed sensor is a sensor which measures the rotation speed of the wheel, e.g., based on a Hall effect sensor, a rotary encoder, or the like. Wheel speed sensors are generally known and will therefore not be discussed in more detail herein.

Each MSD 104 is connected to an MSD control unit 330 arranged for controlling various operations of the MSD 104. The MSD control system, i.e., the system of MSD control units, is preferably a decentralized system running on a plurality of separate wheel-end computers, although centralized implementations are also possible. It is furthermore appreciated that some parts of the MSD control system may be implemented on processing circuitry remote from the vehicle, such as on a remote server 120 accessible from the vehicle via wireless link. Each MSD control unit 330 is connected to a VMM system or function 360 of the vehicle 100 via a data bus communication arrangement 114 that can be either wired, wireless or both wired and wireless. Hereby, control signals can be transmitted between the VMM function 360 and the MSD control units 330. The VMM function 360 and the MSD control units 330 will be described in more detail below in connection to FIG. 3 and FIG. 5.

The VMM function 360 as well as the MSD control units 330 may include a microprocessor, microcontroller, programmable digital signal processor or another programmable device. The systems may also, or instead, include an application specific integrated circuit, a programmable gate array or programmable array logic, a programmable logic device, or a digital signal processor. Where the system(s) include(s) a programmable device such as the microprocessor, microcontroller or programmable digital signal processor mentioned above, the processor may further include computer executable code that controls operation of the programmable device. Implementation aspects of the different vehicle unit processing circuits will be discussed in more detail below in connection to FIG. 9.

Generally, the MSDs on the vehicle 100 may also comprise, e.g., a power steering device, active suspension devices, and the like. Although these types of MSDs cannot be used to directly generate longitudinal force to accelerate or brake the vehicle, they are still part of the overall vehicle motion management of the heavy-duty vehicle and may therefore form part of the herein disclosed methods for vehicle motion management. Notably, the MSDs of the heavy-duty vehicle 100 are often coordinated in order to obtain a desired motion by the vehicle. For instance, two or more MSDs may be used jointly to generate a desired propulsion torque or braking torque, a desired yaw motion by the vehicle, or some other dynamic behavior. Coordination of MSDs will be discussed in more detail in connection to FIG. 5.

Longitudinal wheel slip $\lambda_x$ may, in accordance with SAE J370 (SAE Vehicle Dynamics Standards Committee Jan. 24, 2008) be defined as $$\lambda_x = \frac{R\omega_x - v_x}{\max(|R\omega_x|, |v_x|)}$$

where R is an effective wheel radius in meters, $\omega_x$ is the angular velocity of the wheel, and $v_x$ is the longitudinal speed of the wheel (in the coordinate system of the wheel). Thus, $\lambda_x$ is bounded between −1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel. The VMM function 360 and optionally also the different MSD control units 330 maintain information on $v_x$ in the reference frame of the wheel, while a wheel speed sensor 106 can be used to determine $\omega_x$ (the rotational velocity of the wheel).

Slip angle $\alpha$, also known as sideslip angle, is the angle between the direction in which a wheel is pointing and the direction in which it is actually traveling (i.e., the angle between the longitudinal velocity component $v_x$ and the vector sum of wheel forward velocity $v_x$ and lateral velocity $v_y$. This slip angle results in a force, the cornering force, which is in the plane of the contact patch and perpendicular to the intersection of the contact patch and the midplane of the wheel. The cornering force increases approximately linearly for the first few 10 degrees of slip angle, then increases non-linearly to a maximum before beginning to decrease.

The slip angle, $\alpha$ is often defined as $$\alpha = \arctan\left(\frac{v_y}{|v_x|}\right)$$

where $v_y$ is the lateral speed of the wheel in the coordinate system of the wheel.

Herein, longitudinal speed over ground may be determined relative to the vehicle, in which case the speed direction refers to the forward direction of the vehicle or relative to a wheel, in which case the speed direction refers to the forward direction, or rolling direction, of the wheel. The same is true for lateral speed over ground, which can be either a lateral speed of the vehicle or a lateral speed over ground of a wheel relative to its rolling direction. The meaning will be clear from context, and it is appreciated that a straight forward conversion can be applied in order to translate speed over ground between the coordinate system of the vehicle and the coordinate system of the wheel, and vice versa. Vehicle and wheel coordinate systems are discussed, e.g., by Thomas Gillespie in "Fundamentals of Vehicle Dynamics" Warrendale, PA: Society of Automotive Engineers, 1992.

In order for a wheel (or tyre) to produce a wheel force which affects the motion state of the heavy-duty vehicle, such as an acceleration, slip must occur. For smaller slip values the relationship between slip and generated force is approximately linear, where the proportionality constant is often denoted as the slip stiffness $C_x$ of the tyre. A tyre is subject to a longitudinal force $F_x$, a lateral force $F_y$, and a normal force $F_z$. The normal force $F_z$ is key to determining some important vehicle properties. For instance, the normal force to a large extent determines the achievable longitudinal tyre force $F_x$ by the wheel since, normally, $F_x \leq \mu F_z$, where $\mu$ is a friction coefficient associated with a road friction condition. The maximum available lateral force for a given wheel slip can be described by the so-called Magic Formula as described in "Tyre and vehicle dynamics", Elsevier Ltd. 2012, ISBN 978-0-08-097016-5, by Hans Pacejka, where wheel slip and tyre force is also discussed in detail.

Figure 2:
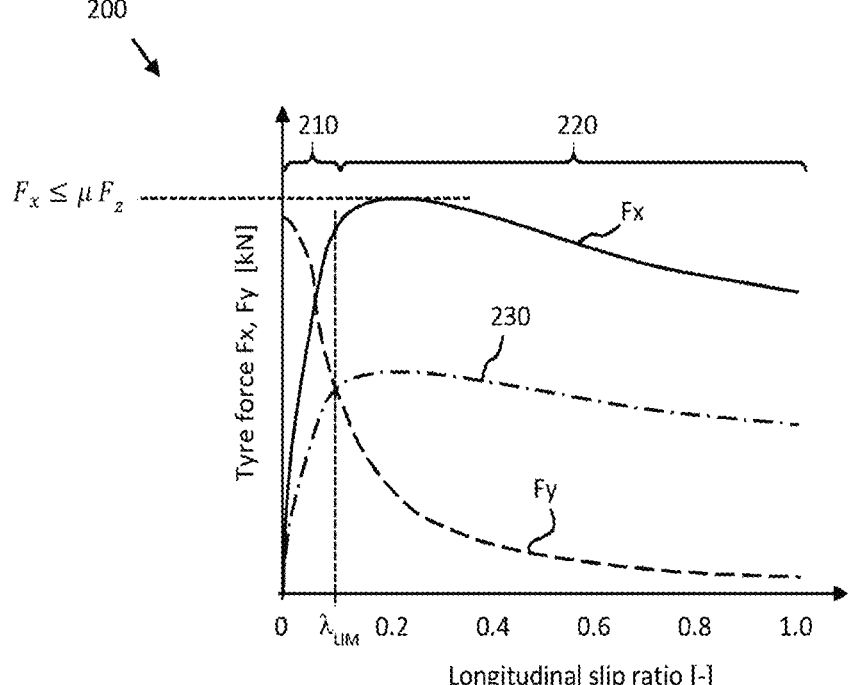
FIG. 2 is a graph showing example tyre forces as function of wheel slip.

FIG. 2 is a graph showing an example 200 of achievable tyre forces as function of longitudinal wheel slip. Fx is the longitudinal tyre force while Fy is the maximum obtainable lateral wheel force for a given wheel slip. This type of relationship between wheel slip and generated tyre force is often referred to as an inverse tyre model, and it is generally known in the art of vehicle dynamics and vehicle control. The examples in FIG. 2 are for positive wheel forces, i.e., acceleration. Similar relationships exist between wheel slip and negative wheel force, i.e., braking.

An inverse tyre model, such as the model 200 illustrated in FIG. 2, can be used to translate between a desired longitudinal tyre force $F_x$ and a corresponding longitudinal wheel slip $\lambda_x$. The interface between VMM and MSDs capable of delivering torque to the vehicle's wheels has as mentioned above traditionally been focused on torque-based requests sent to each MSD control unit 330 from the VMM function 360 without any consideration towards wheel slip. However, this approach has some performance limitations. In case a safety critical or excessive slip situation arises, then a relevant safety function (traction control, anti-lock brakes, etc.) operated on a separate control unit normally steps in and requests a torque override in order to bring the slip back into control. A problem with this approach is that since the primary control of the actuator and the slip control of the actuator are allocated to different electronic control units (ECUs), the latencies involved in the communication between them significantly limits the slip control performance. Moreover, the related actuator and slip assumptions made in the two ECUs that are used to achieve the actual slip control can be inconsistent and this in turn can lead to sub-optimal performance.

Significant benefits can be achieved by instead using a wheel speed or wheel slip-based request on the interface between the VMM function 360 and the MSD control units 330, thereby shifting the difficult actuator speed control loop to the MSD controllers which are closer to the wheels and are therefore generally able to operate with a much shorter control latency compared to that of the central VMM function 360. This type of architecture can provide much better disturbance rejection compared to a torque-based control interface and thus improves the predictability of the forces generated at the tyre road contact patch.

Referring again to FIG. 2, the example longitudinal tyre force Fx shows an almost linearly increasing part 210 for small wheel slips, followed by a part 220 with more non-linear behavior for larger wheel slips. It is desirable to maintain vehicle operation in the linear region 210, where the obtainable longitudinal force in response to an applied brake command is easier to predict, and where enough lateral tyre force can be generated if needed. To ensure operation in this region, a wheel slip limit $\lambda_{lim}$ on the order of, e.g., 0.1 or so, can be imposed on a given wheel. Thus, having accurate knowledge of current wheel slip, operation in the linear region can be ensured, which greatly simplifies vehicle motion control for both safety, efficiency, and driver comfort.

A further benefit of this wheel-slip based control approach is that variations in road friction is handled in an efficient manner. A decrease in road friction generally results in a vertical scaling of the inverse tyre model, as exemplified by the dash-dotted curve 230 in FIG. 2. Note that the peak force stays at basically the same level of wheel slip. Hence, a wheel controller maintaining a given degree of wheel slip, say $\lambda=0.25$, will automatically adjust to the change in friction, keeping tyre force close to optimum despite an abrupt change in friction.

A problem encountered when using wheel slip to actively control one or more wheels on a heavy-duty vehicle, such as the vehicle 100, and also when executing more low complex control such as imposing the above-mentioned wheel slip limit $\lambda_{lim}$ locally at wheel end, is that the speed over ground $v_x$ of the wheel (and of the vehicle) may not be accurately known. For instance, if wheel speed sensors 106 such as Hall effect sensors or rotational encoders are used to determine vehicle speed over ground, then the vehicle speed over ground will be erroneously determined in case the wheels used for estimating the speed over ground are themselves slipping excessively.

Satellite based positioning systems can as mentioned above be used to determine the speed over ground of a heavy-duty vehicle 100 and of any given wheel on the vehicle 100. However, these systems do not function well in some environments, such as environments without a clear view of the sky. Multipath propagation of the satellite radio signals can also induce large errors in the estimated vehicle position, which then translates into errors in the estimated vehicle speed over ground.

Vision-based sensor systems and radar systems can also be used to determine vehicle speed over ground. However, such systems are relatively costly and not always without issues when it comes to accuracy and reliability. Vision-based sensor may for instance suffer from performance degradation due to sun glare and fog, while radar sensor systems may be prone to interference from other radar transceivers.

For these and other reasons, a combination of IMUs and wheel speed sensors are commonly used for vehicle speed estimation. As long as there is no torque applied to a wheel, or significant yaw motion by the vehicle, its associated wheel slip on at least some of the wheels is likely small, meaning that the wheel speed data is most likely also an accurate representation of the speed over ground of the vehicle. During periods of high wheel slip, such as when there is an applied torque to a wheel, the IMU signal can be temporarily relied upon to estimate vehicle speed over ground. In this way the periods of high wheel slip (and unreliable wheel speed sensor data) can be "bridged" by instead relying on the IMU signal to track the vehicle speed over ground until the wheel slip becomes small enough for the wheel speed signals to be relied upon again. Some examples of the VMM function 360 described herein is arranged to base the estimated vehicle motion state s primarily on the IMU signal in case of an applied torque at the wheel 102, 310 on the vehicle 100, and primarily on the wheel speed signal otherwise. In other words, if there is no or only a little torque applied at a wheel, then that wheel speed data can be used for vehicle speed over ground determination. The IMU signal is instead relied upon to determine vehicle speed over ground during periods of high applied torque. Weighted combinations of the two sensor types are of course also possible, as will be discussed in the following.

Generally, it is possible to make the wheel speed signal from a wheel speed sensor more suitable for determining vehicle speed over ground by reducing the torque applied to the wheel, since a free-rolling wheel can be expected to be associated with less wheel slip compared to a wheel with a large magnitude applied torque, which means that the wheel speed will be closer to the actual vehicle speed over ground.

However, placing a wheel in free-rolling state takes time, and it is of course undesired to keep wheels in free-rolling state if there is a need for torque to control vehicle motion. To reduce the time it takes to place a wheel in free-rolling condition (or at least close to free-rolling condition) such that vehicle speed over ground can be reliably determined using the wheel speed signal, it is proposed herein to apply a short burst of counter-torque, i.e., a torque of opposite sign compared to the currently applied torque, to the wheel prior to sampling the wheel speed signal to determine vehicle speed over ground. For instance, if the vehicle 100 is currently engaged in a braking maneuver where negative torque is applied at some wheel, a short burst of positive torque (propulsion torque) can be applied to bring the wheel up to a speed closer to the vehicle speed, whereupon the wheel speed signal can be sampled to determine vehicle speed over ground, before applying the braking torque again to continue the braking maneuver. Similarly, if the vehicle 100 is engaged in an acceleration maneuver where current applied torque is positive, then an accurate vehicle speed reading based on wheel speed signal can be obtained by first applying a time-limited transient braking torque to slow down the wheel in order to bring it closer to actual vehicle speed over ground, sample the wheel speed signal, and then re-apply the positive torque to continue the acceleration maneuver. From these examples it is appreciated that the time duration required to place a wheel in free-rolling condition is significantly reduced by the techniques proposed herein in comparison to known techniques which simply reduce applied torque in order to bring the wheel into a state close to free-rolling.

FIGS. 4A-D illustrate an example sequence of applied torques that explain the basic concept of the proposed technique. At time t=t0 the vehicle 100 is engaged in a maneuver comprising a current torque T1 applied at some wheel 310 having a wheel speed $\omega_x$. At time t=t1 there is a desire to determine vehicle speed over ground using a wheel speed sensor arranged at the wheel 310. Thus, a transient amount of torque T2 of opposite sign compared to the currently applied torque T1 is used to bring the speed of the wheel $\omega_x$ closer to vehicle speed over ground $v_x$. At time t=t2 the transient amount of torque is removed, and the wheel speed signal is sampled, before re-applying the torque T1 used for vehicle maneuvering at time t=t3.

To summarize, there is disclosed herein aspects of a VMM system 360 for a heavy-duty vehicle 100. The system comprises at least one wheel speed sensor 106 configured to output a wheel speed signal indicative of a rotation speed of a wheel 102, 310 on the vehicle 100, and at least one torque-generating device 320, 340 arranged to apply torque to the wheel 102, 310. The at least one torque-generating device 320, 340 is preferably but not necessarily controlled by a local MSD control unit 330 arranged to receive a request for vehicle speed determination from a central VMM control function. The at least one torque-generating device 320, 340 may comprise an electric machine capable of generating both positive and negative torque at the wheel, and/or a friction brake 320. It is noted that the friction brake is not capable of generating positive torque, hence the friction brake can only be used to "un-slip" a wheel where current applied torque is positive, i.e., during a maneuvers involving vehicle acceleration.

The VMM system 360 comprises processing circuitry 910 which will be discussed in more detail below in connection to FIG. 9. The processing circuitry 910 is arranged to determine at least the direction of a current applied torque at the wheel 102, 310, and in preparation for determining wheel speed by the wheel speed signal, to apply a transient amount of torque to the wheel 102, 310 by the torque-generating device 320, 340 during a limited time period in a direction opposite to the direction of the current applied torque at the wheel 102, 310. This transient amount of torque has as explained above the effect of unslipping the wheel, bringing the wheel speed closer to the vehicle speed over ground. The counter-sign torque applied to the wheel more quickly reduces the difference between wheel speed and vehicle speed, i.e., more quickly reduces wheel slip, so that a vehicle speed measurement can be made. A wheel used for braking, for instance, will have a lower speed compared to the vehicle, and if no counter-sign torque is applied it will take more time for the wheel to attain a zero or low slip condition, where vehicle speed can be accurately measured.

By applying a counter-torque to the wheel, the "sampling duration", i.e., the time to determine vehicle speed accurately, becomes smaller compared to if no counter-torque is applied. By the present technique, the vehicle motion management system can quickly place a request for vehicle speed measurement, whereupon a wheel is "un-braked" or "un-accelerated" by a counter-sign torque, whereupon the vehicle speed is quickly determined, and the wheel is then again used for vehicle control.

The technique is particularly suitable for wheels driven by electric machines, which are able to quickly apply torque of arbitrary magnitude duration and sign. The larger the difference between wheel speed and vehicle speed, the higher the mechanical impulse required to reduce the magnitude of the wheel slip such that vehicle speed can be determined with high accuracy.

The duration of the limited time period and/or the transient amount of torque is optionally determined based on an inertia of the wheel 102, 310 on the vehicle 100. The relationship between the inertia of a rotating system, its acceleration and torque applied to the system is generally known and will therefore not be discussed in detail herein. Various models and approximative relationships can be used to relate applied torque and time period to speed change and inertia at different degrees of approximation. For instance, given the wheel system inertia J, the expected angular mechanical impulse $T(t_1-t_0)$ that is required to change the speed of a wheel axle from one axle speed $\omega_0$ to another axle speed $\omega_1$ from time $t_0$ to time $t_1$ can be determined from the expression $$\int_{t_0}^{t_1} (T + T_0)dt = \int_{\omega_0}^{\omega_1} (J + J_0)\, d\omega$$

where T is the applied torque, $T_0$ represents friction losses and the like, J is the wheel system inertia and $J_0$ summarizes contributions to system inertia from other components in the system, i.e., $J+J_0$ is the total system inertia. The applied torque T is in most cases significantly larger than $T_0$. In case J is also significantly larger than $J_0$, the expression simplifies to:

$$J(\omega_1 - \omega_0) \approx T(t_1 - t_0)$$

where T is a constant torque. If needed, $T_0$ and $J_0$ can be handled as calibration parameters. I.e., if either $T_0$ and/or $J_0$ are large enough to have a significant effect on the system, then they can be included in the model.

Their values can be pre-configured or measured during a calibration operation involving, e.g., a reference wheel having known inertia. The amount of applied mechanical impulse used to un-slip a wheel can be controlled by the time duration of applied torque and/or by the magnitude of the applied torque.

The duration of the limited time period and/or the magnitude of the transient amount of torque is preferably determined based on a speed difference between the wheel speed and the vehicle speed, such that more torque for a longer time duration is applied to un-slip the wheel if the change in speed required to bring the wheel speed closer to vehicle speed is larger compared to if there is a smaller difference between wheel speed and vehicle speed. The speed difference can be estimated using various methods, some of which will be discussed below in connection to the motion estimation function of the vehicle 100. An IMU can for instance be used to temporarily estimate vehicle speed over ground inbetween reliable measurements of speed over ground.

The duration of the limited time period and/or the magnitude of the transient amount of torque is, according to some aspects of the herein disclosed techniques, at least partly determined based on a type of the vehicle 100 and/or based on the type of tyres mounted on the wheel. Thus, the technique for un-slipping a wheel using a burst of counter torque can be calibrated based on type of vehicle and/or based on type of wheel, which improves the accuracy of the un-slipping, i.e., which optimizes the amount of applied angular impulse such that the wheel quickly reaches a state close to free-rolling, where vehicle speed can be accurately determined using the wheel speed signal. The type of the tyres may be indicative of a tyre dimension, a tyre weight, or a measure of tyre inertia. The duration of the limited time period and/or the magnitude of the transient amount of torque can at least partly be determined based on a look-up table or other form of function. This look-up table of function can for instance be indexed by estimated speed difference, i.e., the difference between a current estimate of vehicle speed over ground and a current reading of the wheel speed signal, such that a speed difference can be translated into a suitable angular impulse to be applied. The current estimate of vehicle speed over ground can be obtained, e.g., from a IMU or from some other sensor system configured to determine vehicle speed over ground. The VMM system 360 can also be arranged to update the look-up table periodically based on a response of the wheel to the transient amount of torque. In other words, the VMM system 360 can be configured to observe the change in wheel speed as a result of an applied torque, potentially also given current vehicle state, and from there determine suitable angular impulses to apply to the wheel to bring about a desired change in wheel speed of rotation.

An IMU can, as mentioned above, be used to determine vehicle speed over ground if a known starting velocity is known. A problem with most IMUs used for determining vehicle speed over ground is the drift caused by inaccuracies and bias in the IMU output. To reduce issues with IMU drift, it is proposed herein to model the error incurred by integrating the IMU signal to obtain vehicle speed over ground. When this modelled error becomes unacceptably large, the estimated speed over ground based on the IMU signal is "reset" based on wheel speed sensor data using data from one or more free-rolling wheels, or at least from wheels where applied torque is small. If no suitable low-slip wheel is available, then the method applies the counter-torque discussed above to un-slip one or more wheels, samples the vehicle speed using the associated wheel speed sensors, and then re-applies the torque to continue the current maneuver. Thus, according to the techniques proposed herein, the vehicle control function in the MSD control unit 330 and/or in the VMM function 360 selectively and temporarily places one or more wheels in a free-rolling condition (or at least in a condition where wheel slip is small) in order to obtain reliable vehicle speed over ground data from the wheel speed sensor of the free-rolling wheel. Once the vehicle speed over ground has been determined in this manner, it can be used to reset the IMU-based vehicle speed over ground estimate.

In other words, the motion estimation function of the vehicle 100 may in some cases obtain information indicating if the speed over ground determined based on the IMU signal output is sufficiently accurate or not. In case the speed over ground data from the IMU is not reliable enough to perform vehicle motion management, the MSD coordination function quickly reduces wheel slip of one or more wheels on the heavy-duty vehicle, e.g., by introducing constraints into a mathematical optimization problem solved to obtain the MSD coordination solution which fulfils the global force requirements. Because the slip reduction is temporary, the function is similar to an anti-lock braking function (ABS) which intermittently reduces wheel slip in a periodic manner. When the wheel slip of a given wheel is reduced, the reliability of the vehicle speed over ground data obtainable from the wheel speed sensors of that wheel increases.

To summarize the discussion so far, there is also disclosed herein a VMM function 360 for a heavy-duty vehicle 100. The system comprises at least one wheel speed sensor 106 configured to output a wheel speed signal indicative of a rotation speed of a respective wheel 102 on the vehicle 100, and also at least one IMU 110 configured to output an IMU signal indicative of an acceleration of the vehicle 100 relative to ground. A motion estimation function of the vehicle, often but not necessarily forming part of the VMM function 360, is configured to estimate a vehicle motion state s comprising vehicle speed over ground, based at least in part on the wheel speed signal and at least in part on the IMU signal. The motion estimation function may, for instance, implement a sensor fusion algorithm where the data from the wheel speed sensors of the vehicle and the data from the IMU or IMUs of the vehicle are merged into an estimate of vehicle motion state. Such sensor fusion can be implemented by known methods, e.g., in a Kalman filter or the like. The motion estimation function may also be less complex, such as simply switching between vehicle speed over ground estimation based on one or more wheel speed signals and vehicle speed over ground estimation based on an integrated IMU acceleration signal.

An MSD coordination function of the vehicle 100 is configured to coordinate actuation of a plurality of MSDs of the heavy-duty vehicle in dependence of a vehicle motion request 375 and the vehicle motion state s, e.g., in dependence of a desired acceleration profile or curvature to be followed by the vehicle 100. The MSD coordination function may comprise elements of mathematical optimization in order to obtain a desired motion by the vehicle, or more low complex, such as using positive torque generating actuators in case acceleration is desired and negative torque generating actuators if deceleration is desired. Various types of MSD coordination functions are known in the art and the topic will therefore not be discussed in more detail herein. It is noted that the MSD coordination function can be of varying complexity, ranging from a simple connection between control input means of the vehicle (steering wheel, pedals, etc) and MSD actuators, to more advanced control methods.

The motion estimation function is arranged to model an error in the estimated vehicle motion state s and to output a free-rolling request to the MSD coordination function in case the modelled error fails to meet an acceptance criterion. The modelling of the error can also be of varying complexity, as will be discussed below. A simple linear function increasing with time can for instance be used to model the error. More advanced error modelling methods may account also for other sources of information, and more than one sensor device. The MSD coordination function is configured to reduce a wheel slip set-point of one or more wheels 102 of the heavy-duty vehicle 100 in response to receiving the free-rolling request 550 from the motion estimation function using the counter-torque techniques discussed above, e.g., in connection to FIGS. 4A-D. The MSD coordination function may for instance be arranged to set a wheel slip request or torque request for one or more wheels 102 of the heavy-duty vehicle 100 to zero in response to receiving the free-rolling request 550, and quickly bring about the change in wheel slip using counter-torque techniques. This reduction in wheel slip set-point of the one or more wheels 102 of the heavy-duty vehicle 100 results in a fast decrease in wheel slip, and therefore an increase in the accuracy of the vehicle speed over ground data obtained from the wheel speed sensors of the wheels with reduced wheel slip set-point. This increased accuracy vehicle speed information can then be used by the motion estimation function to reset the IMU-based vehicle speed estimate.

The IMU output signal is indicative of an acceleration by the IMU component, so an estimated vehicle speed over ground can be obtained by integrating this IMU acceleration signal starting from a known vehicle speed over ground. However, the IMU signal is often biased, and normally also comprise an error, which will accumulate to cause an error in the estimated speed over ground. By characterizing the IMU in terms of this bias and error, a model of the error in the estimated vehicle speed over ground determined from the IMU signal can be constructed. For example, in case the IMU output signal of vehicle longitudinal acceleration $\hat{a}_x$ is roughly modelled as $$\hat{a}_x = a_x + b + n$$

where $a_x$ is the true vehicle longitudinal acceleration (over ground), b is a constant unknown bias and n is some form of measurement noise, such as Gaussian zero mean noise with variance $\sigma^2$, then the accumulated error can be modelled over time as $$e(t) = \int_0^t b + n(t)\, dt$$

If the statistical distribution of the bias b and the measurement noise n is approximately known, then the statistics of the error e(t) can also be determined using straightforward statistical methods or just by practical experimentation or computer simulation. Alternatively, a linear or quadratic function of time, or some other form of polynomial function can be assumed, and adapted to laboratory experiments of the error after integrating the IMU signal over time, e.g., by least-squares fit to measurement data.

The acceptance criterion can be a fixed threshold on the estimated error in the IMU signal integrator, or some statistical measure of error. For instance, the system may require that the probability of the actual error exceeding some predetermined threshold is to be kept below some level. In case the estimated error grows too much, i.e., if the IMU signal is relied upon for too long to estimate vehicle speed over ground, then the free-rolling request is triggered, which results in free-rolling (or at least reduced wheel slip) by at least one wheel, and consequently in the availability of more reliable wheel speed data which can be used to reset the IMU signal integrator used to estimate vehicle speed over ground. When the IMU signal integrator is reset in this manner, using reliable data from the wheel speed sensor or sensors, then the error is also reduced.

A model of IMU error as function of time can as mentioned above be parameterized beforehand, by computer simulation, practical experimentation, and/or mathematical analysis. Such parameterization may for instance involve comparisons between the IMU signal or an estimate of vehicle speed over ground based on an integrated IMU signal and some form of ground truth reference speed over ground, e.g., obtained from GPS. Generally, the motion estimation functions discussed herein may be arranged to model the error in the estimated vehicle motion state s at least in part by modelling an error associated with the IMU signal as a function 400, 420 increasing with time.

Figure 3:
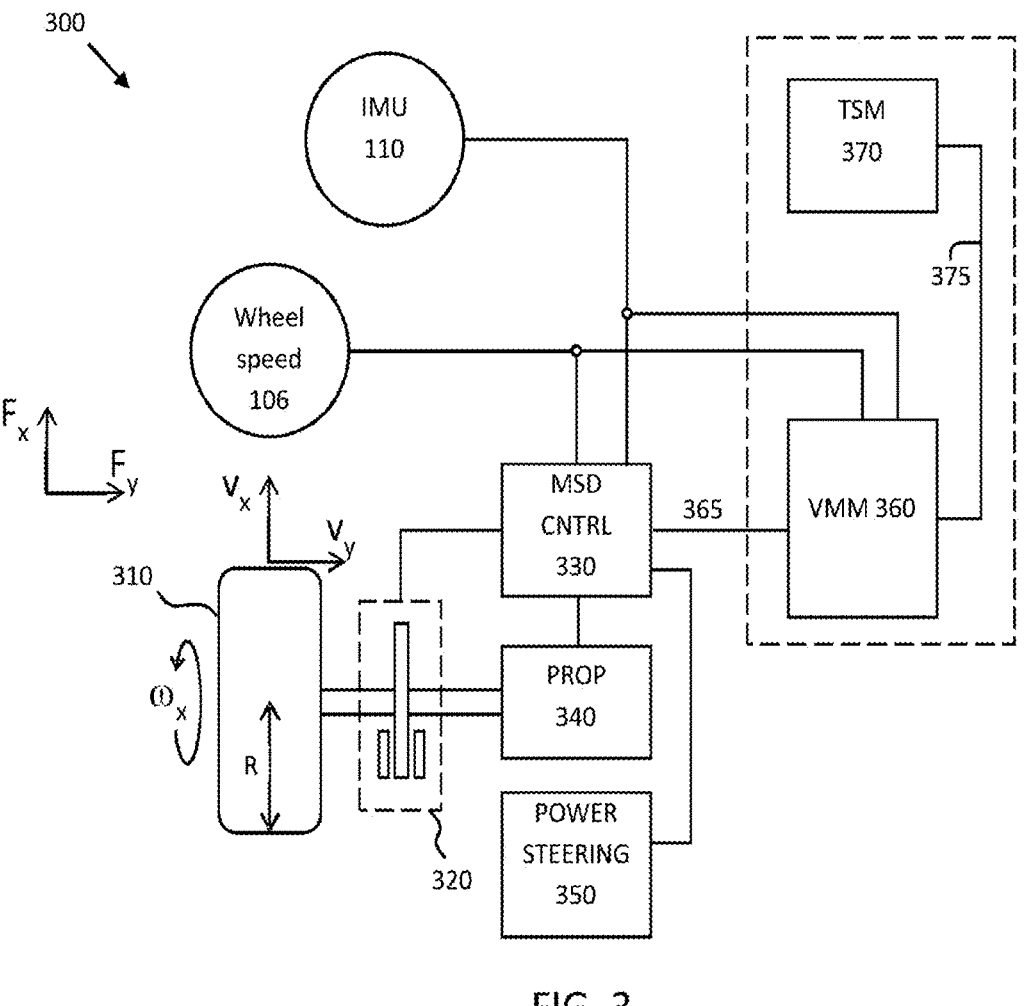
FIG. 3 shows an example motion support device control arrangement.
Figures 4A, 4B, 4C, 4D:
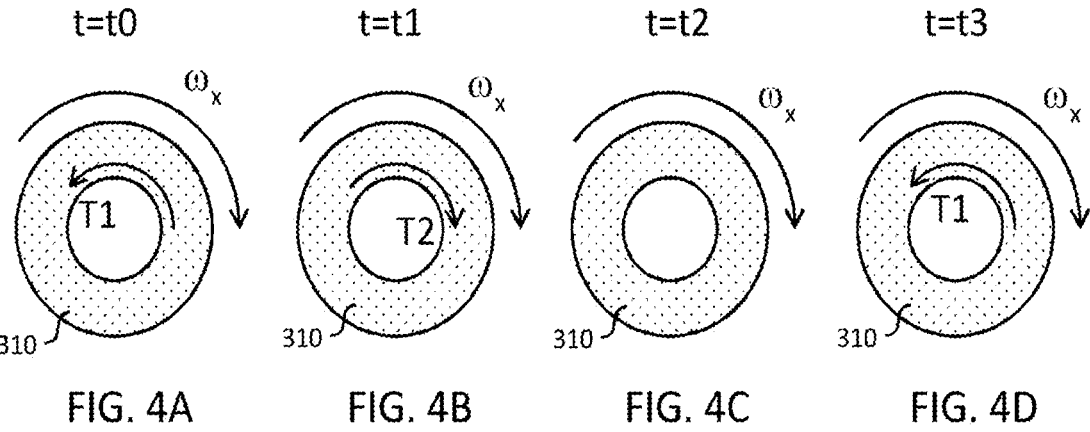
FIGS. 4A-D illustrate an example sequence of applied torques.

FIG. 3 schematically illustrates functionality 300 for controlling a wheel 310 on the vehicle 100 by some example MSDs here comprising a friction brake 320 (such as a disc brake or a drum brake), a propulsion device 340 and a power steering arrangement 350. The friction brake 320 and the propulsion device 340 are examples of wheel torque generating devices, which can be controlled by one or more motion support device control units 330. The control is based on measurement data obtained from a wheel speed sensor 106 in combination with data from one or more IMUs 110, and optionally also based on data from other vehicle state sensors, such as radar sensors, lidar sensors, and also vision based sensors such as camera sensors and infra-red detectors. An MSD control unit 330 may be arranged to control one or more MSD actuators. For instance, it is common that a single MSD control unit 330 is arranged to control both wheels on an axle.

The traffic situation management (TSM) function 370 plans driving operation with a time horizon of 10 seconds or so. This time frame corresponds to, e.g., the time it takes for the vehicle 100 to negotiate a curve or the like. The vehicle maneuvers, planned and executed by the TSM function, can be associated with acceleration profiles and curvature profiles which describe a desired target vehicle velocity in the vehicle forward direction and turning to be maintained for a given maneuver. The TSM function continuously requests the desired acceleration profiles $a_{req}$ and steering angles (or curvature profiles $c_{req}$) from the VMM function 360 which performs force allocation to meet the requests from the TSM function in a safe and robust manner. The VMM function 360 operates on a timescale of below one second or so and will be discussed in more detail below. The VMM function 360 then communicates with the different MSD control units 330 on the vehicle via interface 365. The communication on the interface 365 may involve, e.g., transmission of wheel slip set-points to the MSD control unit and reception of capability signals from the MSD control unit 330.

The wheel 310 has a longitudinal velocity component $v_x$ and a lateral velocity component $v_y$ (in the coordinate system of the wheel or in the coordinate system of the vehicle, depending on implementation). There is a longitudinal wheel force $F_x$ and a lateral wheel force $F_y$, and also a normal force $F_z$ acting on the wheel (not shown in FIG. 3). Unless explicitly stated otherwise, the wheel forces are defined in the coordinate system of the wheel, i.e., the longitudinal force is directed in the rolling plane of the wheel, while the lateral wheel force is directed normal to the rolling plane of the wheel. The wheel has a rotational velocity $\omega_x$, and an effective rolling radius R.

The motion estimation systems discussed herein are used at least in part to determine vehicle speed over ground, which can then be translated into wheel speed components $v_x$ and/or $v_y$, in the coordinate system of the wheel. This means that the wheel steering angle $\delta$ is taken into account if the wheel is a steered wheel, while a non-steered wheel has a longitudinal velocity component which is the same as the vehicle unit to which the wheel is attached, normally a truck or a trailer vehicle unit.

The type of inverse tyre models exemplified by the graph 200 in FIG. 2 can be used by the VMM 360 to generate a desired tyre force at some wheel. Instead of requesting a torque corresponding to the desired tyre force, the VMM can translate the desired tyre force into an equivalent wheel slip (or, equivalently, a wheel rotation speed relative to a speed over ground) and request this slip instead. The main advantage being that the MSD control unit 330 will be able to deliver the requested torque with much higher bandwidth by maintaining operation at the desired wheel slip, using the vehicle speed $v_x$ obtained from processing of the data from the IMU 110 and the wheel rotational velocity $\omega_x$ obtained from the wheel speed sensor 106. The control unit 330 or units can be arranged to store one or more pre-determined inverse tyre models in memory, e.g., as look-up tables or parameterized functions. An inverse tyre model can also be arranged to be stored in the memory as a function of the current operating condition of the wheel 310.

According to a simple example of the techniques proposed herein, as long as no torque is applied to a wheel, the vehicle speed data obtained from the wheel speed sensor 106 is deemed reliable and used at the MSD control unit 330 for determining vehicle speed over ground and/or fed back to the VMM function 360 where it is used as basis for determining vehicle speed over ground. If torque is applied, e.g., by the propulsion device 340 or the service brake 320, then the acceleration data from the IMU 110 is integrated in order to track the vehicle speed over ground in lieu of the data from the wheel speed sensor. This way the MSD control unit 330 can determine wheel slip during application of torque, since the vehicle speed over ground can be tracked for a limited duration of time using the IMU signal while the wheel speed sensor provides wheel speed information during the generation of tyre force.

Due to the accumulation of error in the integrated IMU signal, the accuracy of the vehicle speed over ground determined based on the IMU output signal is deteriorating over time. When the estimated error magnitude (obtained from the type of model discussed above) has become unacceptably large, a correction of the IMU integrator is performed by quickly placing the wheel in free-rolling condition using a burst of counter-torque, estimating vehicle speed over ground based on the wheel speed sensor, re-initializing the IMU integrator again and re-applying torque at the wheel, i.e., as exemplified in FIGS. 4A-D. This free-rolling of the wheel can be triggered centrally by the VMM function 360 or locally at the MSD control unit 330.

Figure 5:
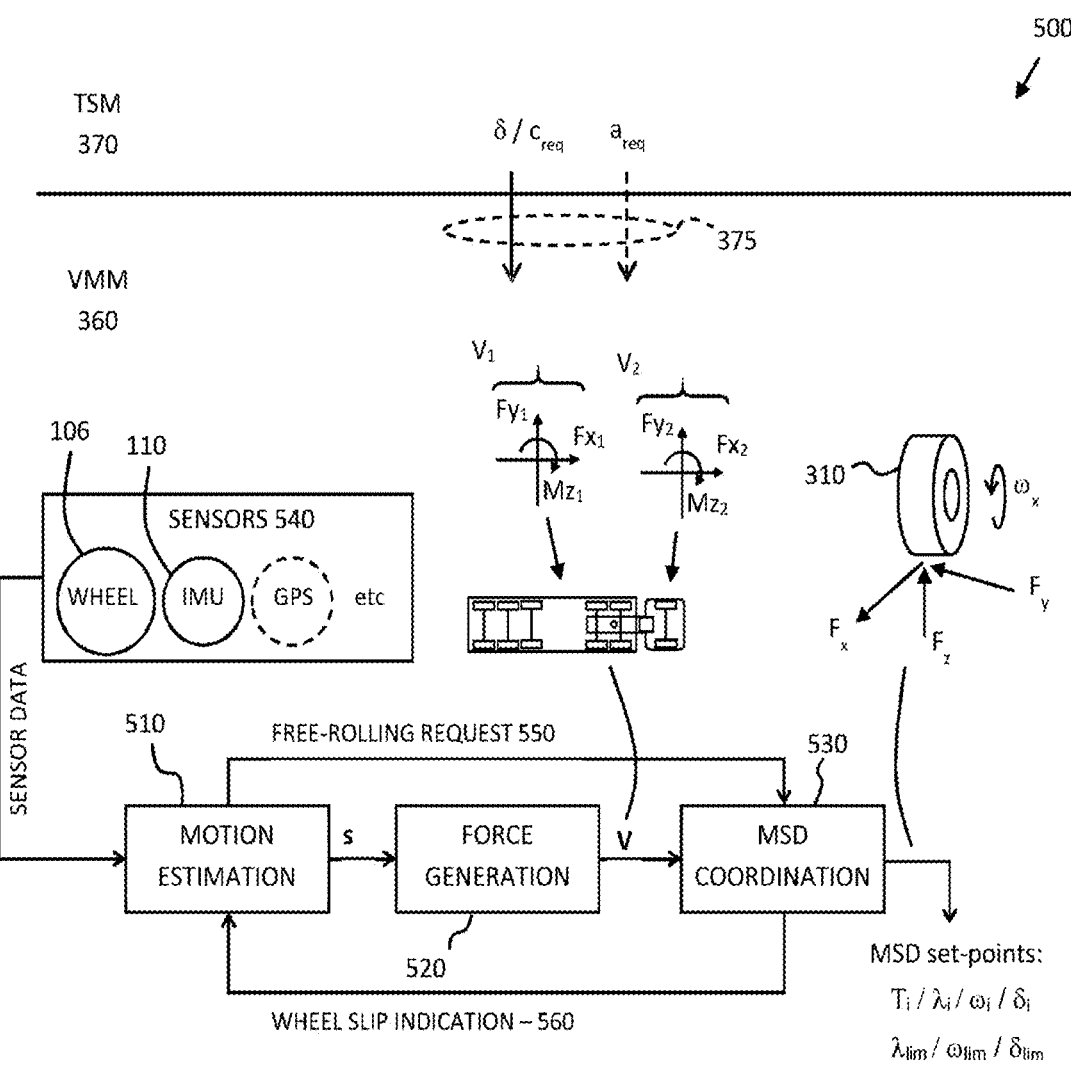
FIG. 5 illustrates an example vehicle control function architecture.
Figure 5:
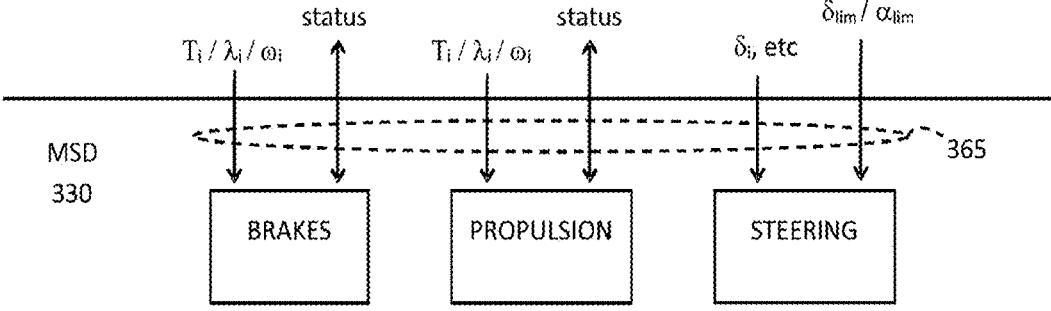

FIG. 5 illustrates an example vehicle control function architecture applicable with the herein disclosed methods. In this example architecture, the TSM function 370 generates vehicle motion requests 375, which may comprise a desired steering angle δ or an equivalent curvature $c_{req}$ to be followed by the vehicle, and which may also comprise desired vehicle unit accelerations $a_{req}$ and also other types of vehicle motion requests, which together describe a desired motion by the vehicle along a desired path at a desired velocity profile. It is understood that the motion requests can be used as base for determining or predicting a required amount of longitudinal and lateral forces which needs to be generated in order to successfully complete a maneuver. The TSM function 370 can of course also be replaced by driver input signals, from a steering wheel and pedals.

The VMM system operates with a time horizon of about 1 second or so, and continuously transforms the acceleration profiles $a_{req}$ and curvature profiles $c_{req}$ from the TSM function 370 into control commands for controlling vehicle motion functions, actuated by the different MSDs of the vehicle 100, that in turn report back respective capabilities to the VMM function 360. The capabilities can then be used as constraints in the vehicle control. The VMM system performs vehicle state or motion estimation, by a motion estimation function 510 as discussed above, i.e., the VMM system continuously determines a vehicle state s comprising, e.g., positions, speeds, accelerations, and articulation angles of the different units in the vehicle combination by monitoring operations using various sensors 540 arranged on the vehicle 100, often but not always in connection to the MSDs. An important input to the motion estimation function 510 are the signals from IMU 110 and the wheel speed sensors 106 on the heavy duty vehicle 100. The motion estimation function 510 is, as discussed above, configured to estimate at least vehicle speed over ground, based on the wheel speed signal from the wheel speed sensors 106 and also on the IMU signal from the IMU 110. The motion estimation function is also arranged to model an error in the estimated vehicle motion state s (at least for the vehicle speed over ground) and to output a free-rolling request 550 to the MSD coordination function 530 (or to some equivalent software module) in case the modelled error fails to meet an acceptance criterion, e.g., a threshold or some pre-determined confidence interval.

The result of the motion estimation 510, i.e., the estimated vehicle state s, is input to a force generation module 520 which determines the required global forces $V=[V_1, V_2]$ for the different vehicle units to cause the vehicle 100 to move according to the requested acceleration and curvature profiles $a_{req}$, $c_{req}$, and to behave according to the desired vehicle behavior. The required global force vector V is input to an MSD coordination function 530 which allocates wheel forces and coordinates other MSDs such as steering and suspension. The MSD coordination function outputs an MSD control allocation for the i:th wheel, which may comprise any of a torque $T_i$, a longitudinal wheel slip $\lambda_i$, a wheel rotational speed $\omega_i$, and/or a wheel steering angle $\delta_i$. The coordinated MSDs then together provide the desired lateral Fy and longitudinal Fx forces on the vehicle units, as well as the required moments Mz, to obtain the desired motion by the vehicle combination 100.

According to the teachings herein, the MSD coordination function is arranged to reduce a wheel slip set-point of one or more wheels 102 of the heavy-duty vehicle 100 in response to receiving the free-rolling request 550 from the motion estimation function. The MSD coordination function may for instance be arranged to set a wheel slip request or torque request for one or more wheels 102 of the heavy-duty vehicle 100 to zero in response to receiving the free-rolling request 550. This way, the motion estimation function 510 can request a temporary increase in the reliability of the wheel speed signal from the wheel speed sensor for estimating vehicle speed over ground when the data from the IMU has deteriorated too much due to error accumulation.

The example VMM function 360 in FIG. 5 manages both force generation and MSD coordination, i.e., it determines what forces that are required at the vehicle units in order to fulfil the requests from the TSM function 370, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels. The forces are determined such as to generate the vehicle behavior which is expected by the TSM function in response to the control inputs generated by the TSM function 370.

The MSD coordination function 530 may implement a mathematical optimization routine which finds an MSD force allocation that corresponds to the required global forces determined by the force generation module 520. The mathematical optimization routine involves constraints, which are limits on the forces possible to generate by a given MSD. Thus, the MSD coordination function 530 can be used to reduce or even remove the wheel slip on one or more wheels 310, which facilitates a more accurate determination of vehicle speed using wheel speed sensors 106. The constraints may be imposed as a wheel slip limit or as a torque limit, which can be set to some small value or even to a zero value where the wheel is essentially in free-rolling state.

According to some aspects, as mentioned above, the MSD coordination function 530 is arranged to set a wheel slip request and/or a torque request for one or more wheels 310 of the heavy-duty vehicle 100 to zero in response to receiving the free-rolling request 550, and also trigger the type of counter-torque generation discussed above in order to more quickly reduce the wheel slip of the wheel. Thus, there will be no positive nor negative wheel forces generated in the longitudinal direction of the wheel, which means that the impact on vehicle speed determination based on wheel speed of the wheel is minimized or at least reduced.

According to some other aspects, the MSD coordination function 530 is arranged to reduce a wheel slip set-point of the one or more wheels 310 of the heavy-duty vehicle 100 in a sequence, where each wheel in the sequence is placed in a low slip condition for a pre-determined short duration of time, such as a second or half a second. This way the actuation over the vehicle can be maintained, since each wheel will only be placed in a low slip condition for a short period of time, after which it can resume force generation.

The MSD coordination function 530 is optionally configured to coordinate actuation of the plurality of MSDs of the heavy-duty vehicle based on the solution to a constrained optimization problem, where one or more constraints of the constrained optimization problem is arranged to be configured in dependence of an estimated error magnitude associated with a vehicle speed over ground based on the IMU signal. This means that the MSD coordination function 530 can simply solve the optimization problem under the constraints that allocated wheel slips at one or more wheels of the heavy-duty vehicle should be kept below some threshold, or even be set to zero, in order to reset the IMU integrator error and enable continued reliable estimation of vehicle speed over ground.

It is noted that the quick free-rolling using counter-torque can also be executed locally, e.g., by the MSD control units 330. This enables the MSD control units to obtain local estimates of vehicle speed over ground, allowing the MSD control units to perform local wheel slip estimation and control. In other words, an MSD control unit can perform slip control using locally available wheel slip data using a vehicle speed over ground determined based on a locally available IMU signal for a limited period of time. When the locally modelled error in the vehicle speed over ground becomes too large, the MSD control unit 330 can report a reduced capability back to the VMM function 360, and then temporarily place its wheel in a reduced slip condition or even in a free-rolling state. The VMM function 360, having received the updated capability message in good time before the wheel is placed in free-rolling state by the MSD control unit 330, is then able to compensate for the action performed locally by the MSD controller 330, e.g., by the MSD coordination function 530.

The MSD coordination function 530 can also be arranged to output data 560 indicative of a wheel slip set-point and/or a torque set-point of a wheel 310 on the heavy-duty vehicle 100 to the motion estimation function 510, i.e., a signal indicative of if a given wheel can be used to determine vehicle speed over ground or not. The motion estimation function 510 is then able to estimate the vehicle motion state s (in particular the vehicle speed over ground) in a more reliable manner, using the wheel slip indication data 560, since it now knows how the wheels will be slipping in the near future (when the MSD set-points are actuated upon by the actuators). The MSD coordination function 530 can for instance communicate the slip limits it has imposed on the different wheels, and the motion estimation function 510 can then determine which wheel speed sensor signals that it can use for reliably estimating vehicle speed over ground. For instance, the motion estimation function 510 can estimate the vehicle motion state s based on wheel speed for wheels where slip is low, and based on the IMU signal or signals otherwise. The motion estimation can also operate in a more proactive manner, avoiding transient error effects resulting from onset of wheel slippage.

The motion estimation function 510 optionally bases the estimate of vehicle motion state s, and estimates of vehicle speed over ground in particular, on a weighted combination of wheel speed sensor data and IMU data, where the weights of the weighted combination is configured in dependence of the data 560 indicative of wheel slip set-point and/or torque set-point. This means that the motion estimation function performs a type of sensor fusion, which accounts for an estimated accuracy of the different sensors, with increased accuracy and reliability as a consequence.

The sensor fusion operation will assign more weight to the data from the IMU 110 in case the IMU integrator has recently been reset compared to when the IMU acceleration signals have been integrated for a longer duration of time, according to a model of error as discussed above. Generally, an estimated parameter $\hat{v}$, such as a vehicle speed over ground, which is estimated based on a weighted combination of N parameters $\{v_1, v_2, \ldots, v_N\}$ can be written as $$\hat{v} = \sum_{i=1}^{N} w_i v_i$$

where $$\sum_{i=1}^{N} w_i = 1,$$

and the relative magnitudes of the weights $w_i$ is configured in dependence of the perceived reliability of the corresponding parameter $v_i$. Thus, in case the IMU estimator performance is very good while the wheels are slipping badly, then the weight of the IMU weight parameter will be close to one, but if the IMU data is not deemed accurate and/or if there is no significant wheel slip on some of the wheels, then the relative weight of the IMU data will be reduced in relation to the weights of the estimate coming from the wheel speed sensors, and optionally also the other data sources, such as an estimate coming from the GPS system.

Particular advantages can be obtained if the wheel slip set-points of the wheels on the heavy-duty vehicle are reduced temporarily in a sequence, such that the slip is temporarily reduced for each wheel in the sequence for a short period of time. This provides an effect from the free-rolling of the wheels which is distributed over the vehicle, avoiding excessive yaw motion, pitch motion, and the like. The MSD coordination function 530 is optionally arranged to reduce respective wheel slip set-points of the one or more wheels 102, 310 of the heavy-duty vehicle 100 in a predetermined or random sequence, where each wheel in the sequence is placed in a low slip condition for a pre-determined and limited duration of time.

The sequence may, for instance, be selected to balance torque loss on the two sides of the vehicle. Thus, the sequence may involve periodic application of wheel slip or torque constraints on the left and the right-hand side of the vehicle, i.e., first a wheel on the left-hand side of the vehicle is placed in a low wheel slip condition, and then a wheel on the right-hand side of the vehicle is placed in a low wheel slip condition, whereupon once more a wheel on the left-hand side is placed in low slip condition. This provides an opportunity for distributing the effects of placing one or more wheels in a low wheel slip condition. The wheel in low slip condition used for estimating vehicle speed can also be switched between two or more axles in sequence. The time period where each wheel is placed in low slip condition need not be very long, normally one second or less is sufficient to get an estimate of vehicle speed from the wheel speed sensor which is not significantly affected by wheel slip.

Generally, when more than one IMU is available, it makes sense to base motion estimation of a given part of the vehicle primarily on the output from an IMU located close to the vehicle part. Weighted combinations of the IMU signals can of course also be used with advantage, where the weights can, e.g., be based on the distance from the given IMU device to the wheel where vehicle speed over ground is needed to determine wheel slip. Generally, the vehicle 100 may comprise a plurality of IMUs, where each wheel on the vehicle is associated with one or more of the plurality of IMUs, and where the associated IMUs provide IMU signals which are used by the VMM function 360 to estimate vehicle speed over ground during periods of time when the wheel is associated with large wheel slip, i.e., a level of wheel slip above some predetermined threshold or failing to meet some other type of predetermined acceptance criterion.

Figure 6:
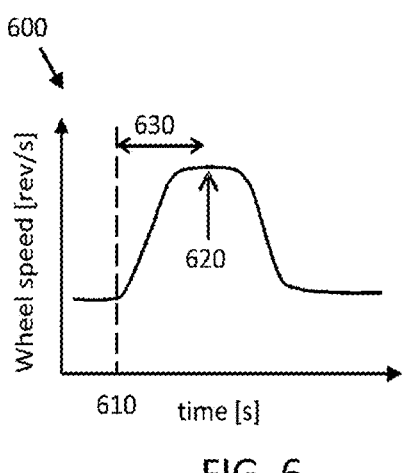
FIGS. 6-7 are graphs illustrating wheel speed signals.

According to other aspects, the motion estimation function 510 is configured to estimate the vehicle motion state s based on the wheel speed signal with a delay relative to the reduction in the wheel slip set-point. This delay allows transients to settle before the vehicle speed over ground is "sampled" using the wheel speed sensor. FIG. 6 shows an example 600 of such transient behavior in the wheel speed sensor signal output. At 610, negative torque is removed from the wheel, i.e., braking is suspended. This causes the wheel to accelerate up to a wheel speed close to the vehicle speed over ground, which happens around the time instant marked 620 after the delay 630. Thus, by allowing for a delay, effects of such transient behavior can be alleviated or even avoided entirely. A similar behavior will be observed if positive torque is removed from the wheel, in which case the wheel speed will decrease to more closely follow the actual vehicle speed over ground.

Figure 7:
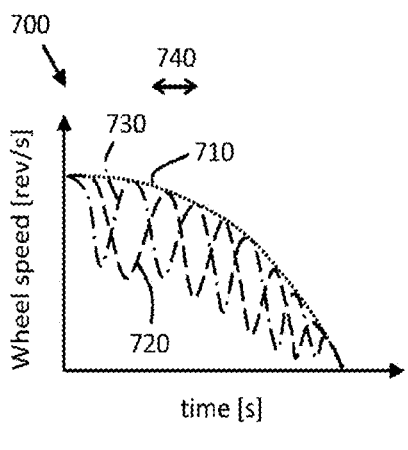

The motion estimation function 510 may also be configured to estimate the vehicle motion state s based on the wheel speed signal as an extreme point of the wheel speed signal (a maximum value in case of braking and a minimum value in case of acceleration) over a given time period. The rationale being that the maximum or minimum wheel speed signal is the closest to the vehicle speed over ground. FIG. 7 illustrates an example 700 where two wheel speed signals 720, 730 are used to estimate vehicle speed over ground. The true vehicle speed over ground is also plotted as the dotted line 710 for reference. It is noted that the wheel speed signals increase as torque is reduced up to a maximum value which is close to the true vehicle speed over ground. Each time a wheel speed maximum value is observed, the IMU integrator can be reset, thus maintaining accurate vehicle speed over ground information throughout the entire vehicle maneuver.

Figure 8:
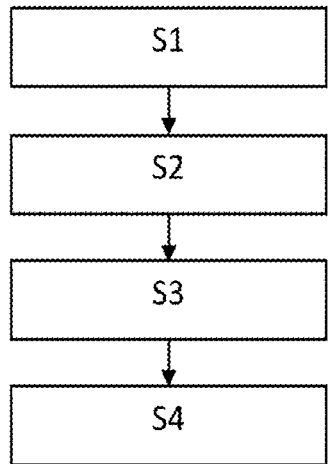
FIG. 8 is a flow chart illustrating methods.

FIG. 8 is a flow chart illustrating a method which summarizes some of the key concepts discussed above. There is illustrated a computer implemented method for performing a VMM function on a heavy-duty vehicle 100. The method comprises configuring S1 at least one wheel speed sensor 106 to output a wheel speed signal indicative of a rotation speed of a wheel 102, 310 on the vehicle 100, and arranging S2 at least one torque-generating device 320, 340 to apply torque to the wheel 102, 310. The method also comprises determining S3 at least the direction of a current applied torque at the wheel 102, 310, and in preparation for determining wheel speed by the wheel speed signal, applying S4 a transient amount of torque to the wheel 102, 310 by the torque-generating device 320, 340 during a limited time period in a direction opposite to the direction of the current applied torque at the wheel 102, 310.

Figure 9:
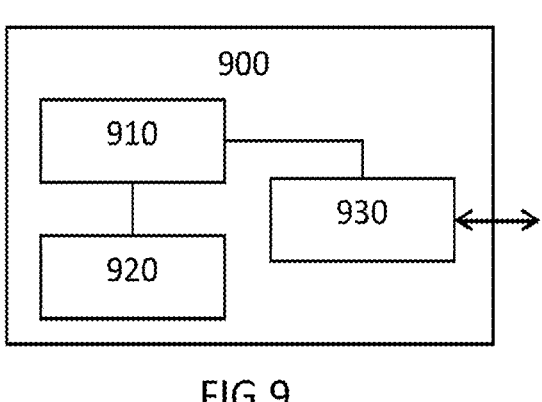
FIG. 9 schematically illustrates a control unit.

FIG. 9 schematically illustrates, in terms of a number of functional units, the components of a control unit 900 according to embodiments of the discussions herein, such as any of the MSD control units 330 or the VMM function 360. Processing circuitry 910 is provided using any combination of one or more of a suitable central processing unit CPU, multiprocessor, microcontroller, digital signal processor DSP, etc., capable of executing software instructions stored in a computer program product, e.g., in the form of a storage medium 930. The processing circuitry 910 may further be provided as at least one application specific integrated circuit ASIC, or field programmable gate array FPGA. Particularly, the processing circuitry 910 is configured to cause the control unit 900 to perform a set of operations, or steps, such as the methods discussed in connection to FIG. 8 and generally herein. For example, the storage medium 930 may store the set of operations, and the processing circuitry 910 may be configured to retrieve the set of operations from the storage medium 930 to cause the control unit 900 to perform the set of operations. The set of operations may be provided as a set of executable instructions. Thus, the processing circuitry 910 is thereby arranged to execute methods as herein disclosed.

The storage medium 930 may also comprise persistent storage, which, for example, can be any single one or combination of magnetic memory, optical memory, solid state memory or even remotely mounted memory.

The control unit 900 may further comprise an interface 920 for communications with at least one external device. As such the interface 920 may comprise one or more transmitters and receivers, comprising analogue and digital components and a suitable number of ports for wireline or wireless communication.

The processing circuitry 910 controls the general operation of the control unit 900, e.g., by sending data and control signals to the interface 920 and the storage medium 930, by receiving data and reports from the interface 920, and by retrieving data and instructions from the storage medium 930. Other components, as well as the related functionality, of the control node are omitted in order not to obscure the concepts presented herein.

Figure 10:
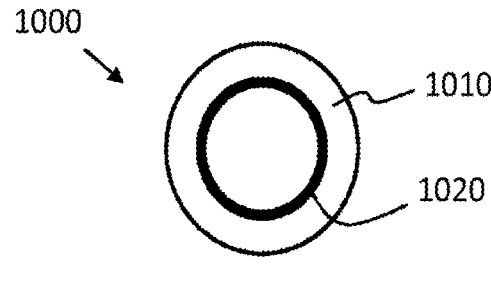
FIG. 10 shows an example computer program product.

FIG. 10 illustrates a computer readable medium 1010 carrying a computer program comprising program code means 1020 for performing the methods illustrated in FIG. 8 and the techniques discussed herein, when said program product is run on a computer. The computer readable medium and the code means may together form a computer program product 1000.

The invention claimed is:

1. A vehicle motion management, VMM, system for a heavy-duty vehicle, the system comprising:
   at least one wheel speed sensor configured to output a wheel speed signal indicative of a rotation speed of a wheel on the vehicle, and
   at least one torque-generating device arranged to apply torque to the wheel, where the VMM system comprises processing circuitry arranged to determine at least the direction of a current applied torque at the wheel, and
   in preparation for determining wheel speed by the wheel speed signal,
   to apply a transient amount of torque to the wheel by the torque-generating device during a limited time period in a direction opposite to the direction of the current applied torque at the wheel.

2. The VMM system according to claim 1, where the at least one torque-generating device is controlled by a motion support device, MSD, control unit arranged to receive a request for vehicle speed determination.

3. The VMM system according to claim 1, where the at least one torque-generating device comprises an electric machine.

4. The VMM system according to claim 1, where the current applied torque at the wheel is a propulsion torque, and the torque-generating device is a friction brake.

5. The VMM system according to claim 1, where the duration of the limited time period and/or the transient amount of torque is determined based on a speed difference between the wheel speed and the vehicle speed.

6. The VMM system according to claim 1, where the duration of the limited time period and/or the transient amount of torque is determined based on an inertia of the wheel on the vehicle.

7. The VMM system according to claim 1, where the duration of the limited time period and/or the transient amount of torque is at least partly determined based on a type of the vehicle and/or based on a type of tyres mounted on the wheel.

8. The VMM system according to claim 1, where the duration of the limited time period and/or the transient amount of torque is at least partly determined based on a look-up table.

9. The VMM system according to claim 8, arranged to update the look-up table periodically based on a response of the wheel to the transient amount of torque.

10. The VMM system according to claim 1, comprising:

a motion estimation function configured to estimate a vehicle motion state comprising vehicle speed over ground, based at least in part on the wheel speed signal, and a motion support device, MSD, coordination function configured to coordinate actuation of a plurality of MSDs of the heavy-duty vehicle in dependence of a vehicle motion request and the vehicle motion state, where the motion estimation function is arranged to output a free-rolling request to the MSD coordination function, where the MSD coordination function is arranged to reduce a wheel slip set-point of one or more wheels of the heavy-duty vehicle in response to receiving the free-rolling request from the motion estimation function.

11. The VMM system according to claim 10, where the MSD coordination function is arranged to set a wheel slip request for one or more wheels of the heavy-duty vehicle to zero in response to receiving the free-rolling request.

12. The VMM system according to claim 10, where the motion estimation function is configured to estimate the vehicle motion state based on the wheel speed signal with a delay relative to the reduction in the wheel slip set-point.

13. The VMM system according to claim 10, where the MSD coordination function is configured to coordinate actuation of the plurality of MSDs of the heavy-duty vehicle based on the solution to a constrained optimization problem, where one or more constraints of the constrained optimization problem is arranged to be configured in dependence of if the free-rolling request has been received.

14. A heavy-duty vehicle comprising a VMM system according to claim 1.

15. A computer implemented method for performing a vehicle motion management, VMM, function on a heavy-duty vehicle, the method comprising:

configuring at least one wheel speed sensor to output a wheel speed signal indicative of a rotation speed of a wheel on the vehicle, and arranging at least one torque-generating device to apply torque to the wheel, determining at least the direction of a current applied torque at the wheel, and in preparation for determining wheel speed by the wheel speed signal, applying a transient amount of torque to the wheel by the torque-generating device during a limited time period in a direction opposite to the direction of the current applied torque at the wheel.

\* \* \* \* \*